US009258057B2

(12) United States Patent
Yamasaki et al.

(10) Patent No.: US 9,258,057 B2
(45) Date of Patent: Feb. 9, 2016

(54) VISIBLE LIGHT COMMUNICATION SYSTEM

(71) Applicant: Panasonic Corporation, Osaka (JP)

(72) Inventors: Shigeaki Yamasaki, Osaka (JP); Eiji Shiohama, Osaka (JP); Shojirou Kido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/309,026

(22) Filed: Jun. 19, 2014

(65) Prior Publication Data
US 2015/0003832 A1 Jan. 1, 2015

(30) Foreign Application Priority Data

Jun. 28, 2013 (JP) .................................. 2013-137158

(51) Int. Cl.
*H04B 10/116* (2013.01)
*H04B 10/11* (2013.01)

(52) U.S. Cl.
CPC .................................. *H04B 10/116* (2013.01)

(58) Field of Classification Search
CPC ..... H04W 4/023; H04W 4/025; H04B 10/116
USPC .................................................. 398/115–131
See application file for complete search history.

(56) References Cited

U.S. PATENT DOCUMENTS

| 6,016,322 | A * | 1/2000 | Goldman | 370/508 |
|---|---|---|---|---|
| 6,978,023 | B2 * | 12/2005 | Dacosta | H04L 63/0492 380/258 |
| 7,360,248 | B1 * | 4/2008 | Kanevsky | G06F 21/31 726/21 |
| 7,559,081 | B2 * | 7/2009 | Seidlein | G06Q 20/32 726/9 |
| 8,188,878 | B2 * | 5/2012 | Pederson et al. | 340/815.45 |
| 8,220,034 | B2 * | 7/2012 | Hahn | H04L 63/083 726/2 |
| 8,248,467 | B1 * | 8/2012 | Ganick et al. | 348/116 |
| 8,321,913 | B2 * | 11/2012 | Turnbull | H04L 63/0492 726/2 |
| 8,644,506 | B2 * | 2/2014 | Zellner | H04L 41/12 380/249 |
| 2002/0055362 | A1 * | 5/2002 | Aoyama | 455/456 |

(Continued)

FOREIGN PATENT DOCUMENTS

| JP | 2007-033125 A | 2/2007 |
|---|---|---|
| JP | 2009-060181 A | 3/2009 |

(Continued)

*Primary Examiner* — Ken Vanderpuye
*Assistant Examiner* — Dibson Sanchez
(74) *Attorney, Agent, or Firm* — Greenblum & Bernstein, P.L.C.

(57) ABSTRACT

A server is configured to manage second positional information, which shows a location of the lighting device, so that the second positional information is associated with the ID information of the lighting device. The server is configured to determine whether or not the ID information received from the receiving terminal is justifiable based on the second positional information, which corresponds to the ID information received from the receiving terminal, and the first positional information, which is received from the receiving terminal. The server is configured to reply, to the receiving terminal, the service information corresponding to the ID information received from the receiving terminal when determining that the ID information received from the receiving terminal is justifiable. The server is configured not to reply the service information to the receiving terminal when determining that the ID information received from the receiving terminal is not justifiable.

17 Claims, 3 Drawing Sheets

(56) References Cited

U.S. PATENT DOCUMENTS

| | | | |
|---|---|---|---|
| 2003/0056121 A1* | 3/2003 | Kimoto et al. | 713/202 |
| 2007/0177161 A1* | 8/2007 | Ishii et al. | 356/614 |
| 2008/0278324 A1* | 11/2008 | Uchimura et al. | 340/572.1 |
| 2008/0281515 A1* | 11/2008 | Ann et al. | 701/210 |
| 2009/0157309 A1* | 6/2009 | Won | G01C 21/20 701/533 |
| 2011/0176803 A1* | 7/2011 | Song | H04B 10/116 398/43 |
| 2012/0144470 A1* | 6/2012 | Kim et al. | 726/7 |
| 2013/0234607 A1* | 9/2013 | Kim et al. | 315/158 |
| 2013/0328481 A1* | 12/2013 | Hiroi | 315/34 |
| 2013/0330085 A1* | 12/2013 | Kusakari | H04W 4/02 398/115 |
| 2013/0343762 A1* | 12/2013 | Murayama | H04B 10/1141 398/130 |
| 2014/0200027 A1* | 7/2014 | Kim | G01S 1/70 455/456.1 |

FOREIGN PATENT DOCUMENTS

| | | |
|---|---|---|
| JP | 2009-206620 A | 9/2009 |
| JP | 2009-222417 A | 10/2009 |
| WO | 2005/086375 A1 | 9/2005 |

* cited by examiner

FIG. 2

| ID INFORMATION | POSITIONAL INFORMATION |
|---|---|
| VLC0001 | LATITUDE:34.89, LONGITUDE:135.62 |
| VLC0002 | LATITUDE:35.70, LONGITUDE:139.78 |
| VLC0003 | LATITUDE:35.17, LONGITUDE:136.91 |
| VLC0004 | LATITUDE:34.44, LONGITUDE:135.24 |
| VLC0005 | LATITUDE:34.25, LONGITUDE:134.72 |
| VLC0006 | LATITUDE:26.19, LONGITUDE:127.64 |

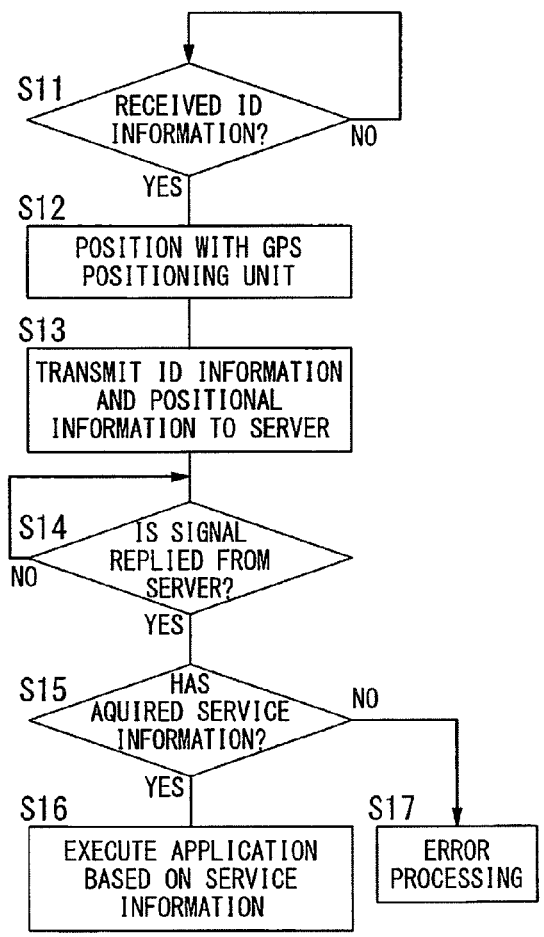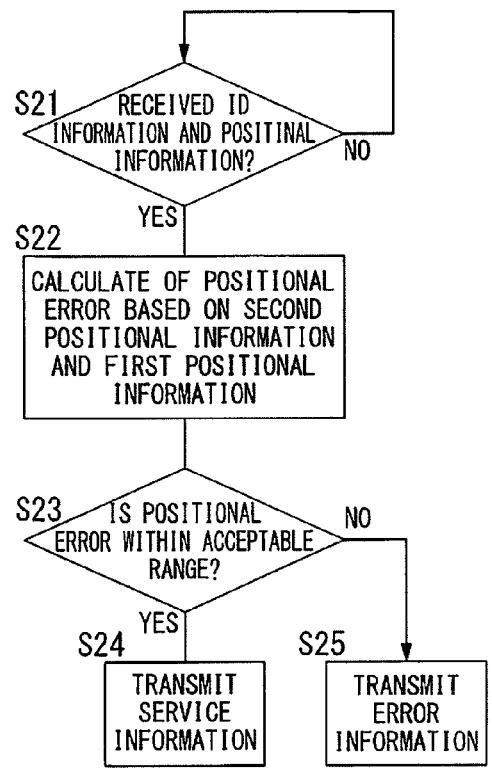
FIG. 3A
FIG. 3B

VISIBLE LIGHT COMMUNICATION SYSTEM

CROSS-REFERENCE TO RELATED APPLICATION

This application claims the benefit of priority of Japanese Patent Application Number 2013-137158, filed on Jun. 28, 2014, the entire contents of which are hereby incorporated by reference.

TECHNICAL FIELD

The present invention relates generally to visible light communication systems and, more particularly, to a visible light communication system with visible light as a communication medium.

BACKGROUND ART

Recently, a visible light communication system (a visible light ID system) is known, which is configured to modulate visible light (illumination light) emitted from a lighting apparatus (a transmitter) to transmit unique ID information and the like to the lighting apparatus, and demodulate the ID information with a receiver (a receiving terminal) configured to receive the visible light (see JP 2009-206620 A, hereinafter referred to as "document 1").

In the conventional example described in the document 1, the visible light communication system includes a server. The server stores translation data table, which translates identification information of the lighting apparatus into positional information of the lighting apparatus, and additional information, which is correlated with the positional information. That is, when receiving the identification information from a prescribed lighting apparatus, the receiving terminal acquires in a lump, from the server, translation data table, which corresponds to a set area relating to the prescribed lighting apparatus, and additional information. Furthermore, when receiving the identification information from a lighting apparatus in the set area, the receiving terminal refers to the translation data table and then outputs positional information and additional information corresponding to the identification information.

By the way, the conventional visible light communication system described in the document 1 or the like has a problem described below about security.

That is, a security measure such as encryption is not often performed for ID information transmitted from the lighting apparatus through the visible light communication. Therefore, content thereof may be easily known to a third party. Accordingly, a person trying to misbehave can access to the server and acquire various information (the positional information or other service information) corresponding to the ID information without acquiring the ID information from the lighting apparatus.

SUMMARY OF THE INVENTION

The present invention has been made in the light of the above-mentioned problem, and it is an object thereof to improve security for ID information.

A visible light communication system according to one aspect of the present invention includes at least one lighting device, a server, and a portable receiving terminal. The lighting device is assigned with unique ID information. The lighting device is configured to transmit the ID information with illumination light as a communication medium. The server is configured to manage service information corresponding to the ID information. The receiving terminal is configured to receive the illumination light emitted from the lighting device to acquire the ID information. The receiving terminal is configured to transmit the acquired ID information to the server to receive, from the server, the service information corresponding to the acquired ID information. The receiving terminal includes a positional information acquisition unit and a transmitter. The positional information acquisition unit is configured to acquire first positional information showing a present location of the receiving terminal. The transmitter is configured to transmit, to the server, the ID information and the first positional information acquired by the positional information acquisition unit. The server is configured to manage second positional information, which shows a location of the lighting device, so that the second positional information is associated with the ID information of the lighting device. The server is configured to determine whether or not the ID information received from the receiving terminal is justifiable based on the second positional information, which corresponds to the ID information received from the receiving terminal, and the first positional information, which is received from the receiving terminal. The server is configured to reply, to the receiving terminal, the service information corresponding to the ID information received from the receiving terminal when determining that the ID information received from the receiving terminal is justifiable. The server is configured not to reply the service information to the receiving terminal when determining that the ID information received from the receiving terminal is not justifiable.

In the visible light communication system according to the one aspect of the present invention, the server is configured to determine that ID information transmitted from a location that is different from an installation location of the lighting device is not justifiable, and then not to transmit service information to a transmitter that transmitted the ID information. Therefore, in the visible light communication system, there is effect that it is possible to improve security for the ID information.

BRIEF DESCRIPTION OF THE DRAWINGS

The figures depict one or more implementations in accordance with the present teaching, by way of example only, not by way of limitations. In the figures, like reference numerals refer to the same or similar elements.

FIG. 2 is a description diagram for describing a database of a server according to the embodiment; and FIG. 3A is a flowchart for describing an operation of a receiving terminal according to the embodiment, and FIG. 3B is a flowchart for describing an operation of the server according to the embodiment.

DETAILED DESCRIPTION

Figure 1:
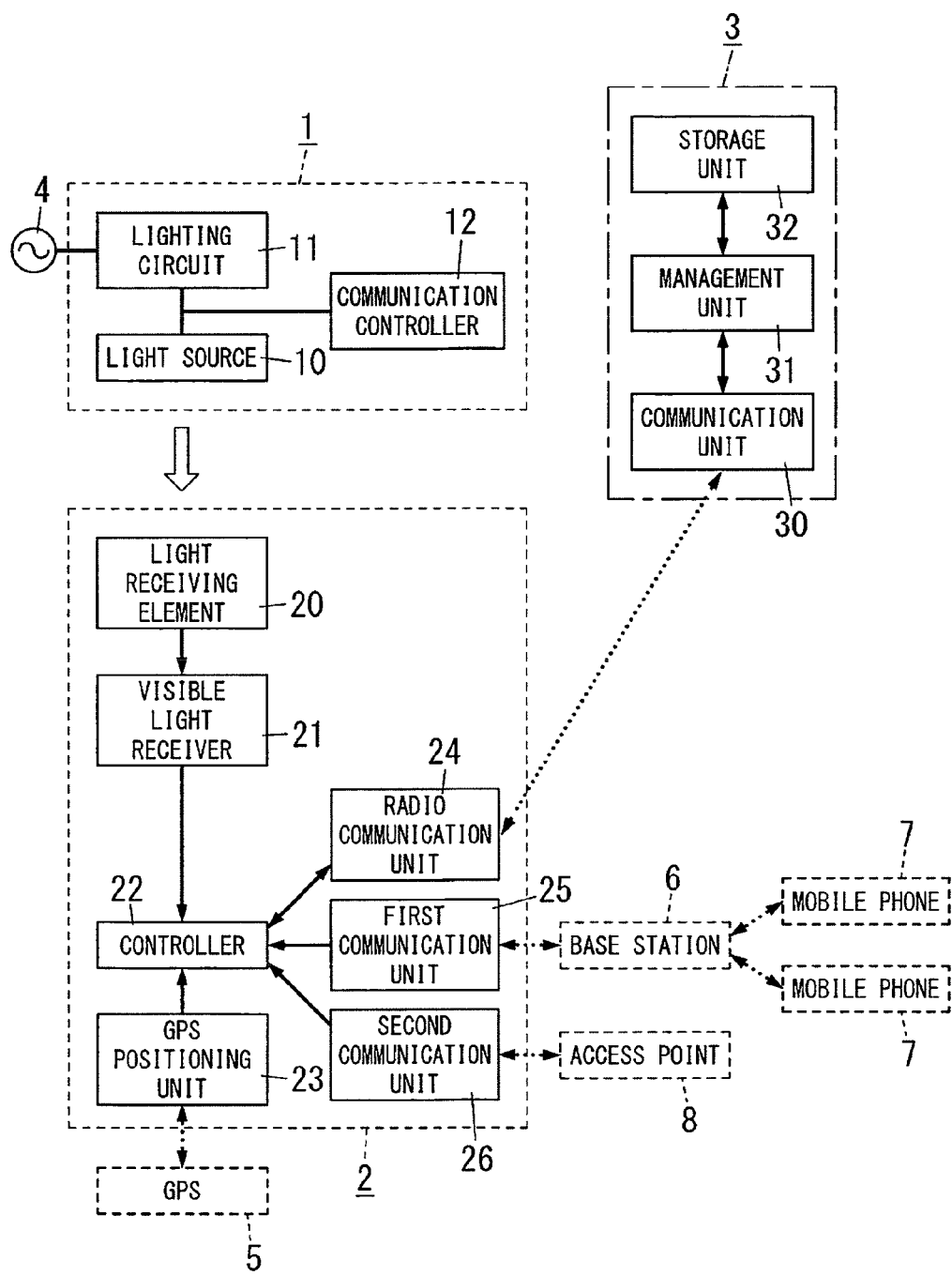
FIG. 1 is a system configuration diagram illustrating a visible light communication system according to an embodiment.

A visible light communication system according to an embodiment is described in detail referring to drawings.

As shown in FIG. 1, the visible light communication system according to the embodiment includes a lighting device 1, a receiving terminal 2, and a server 3. However, FIG. 1 shows only one lighting device 1, but the visible light communication system may include a plurality of lighting devices 1.

The lighting device 1 includes a light source 10, a lighting circuit 11, and a communication controller 12. The lighting device 1 is designed to be disposed at a ceiling, a wall or the like of a building.

The light source 10 includes a light emitting element such as a light emitting diode or an organic electroluminescence element, an incandescent lamp, a fluorescent lamp or the like. The light source 10 of the embodiment includes the light emitting diode.

The lighting circuit 11 is configured to convert AC voltage (or AC current), which is supplied from a commercial power supply 4, into DC voltage (or DC current) and then supply the DC voltage (or the DC current) to the light source 10.

The communication controller 12 is configured to modulate the DC voltage or the DC current supplied from the lighting circuit 11 to the light source 10 to superpose ID information on visible light (illumination light) and transmit the ID information. The ID information is unique identification information assigned to the lighting device 1 (see FIG. 2). However, because such communication controller 12 is well known conventionally, an illustration and a description of a detailed construction are omitted.

The receiving terminal 2 includes a light receiving element 20, a visible light receiver 21, a controller 22, a GPS positioning unit (a positional information acquisition unit) 23, and a radio communication unit 24.

The light receiving element 20 includes a photoelectric transducer (for example, a photodiode or phototransistor) that is configured to receive the visible light and then convert the visible light into an electric signal.

The visible light receiver 21 is configured to demodulate the electric signal output by the light receiving element 20 into the ID information. Then, the visible light receiver 21 is configured to output the ID information to the controller 22.

The GPS positioning unit 23 is configured to position a present location of the receiving terminal 2 with a global positioning system 5 and then output a positioning result (first positional information showing the present location of the receiving terminal 2) to the controller 22.

The radio communication unit 24 is configured to perform data communication with the server 3 through radio communication with electric waves as a medium. Preferably, a communication method with the radio communication is a wireless LAN or a communication method of the data communication, which is provided by a mobile phone provider (for example, W-CDMA or CDMA 2000 (a registered trademark)).

Because the visible light receiver 21, the GPS positioning unit 23, and the radio communication unit 24 described above are well known conventionally, illustrations and descriptions of detailed constructions are omitted.

The controller 22 includes a microcomputer as a main element. The controller 22 is configured to make the microcomputer execute program stored in a memory to perform various processing described below.

The server 3 is composed of a general computer system and software for a server. The server 3 includes a communication unit 30, a management unit 31, and a storage unit 32.

The communication unit 30 is configured to perform data communication through a wire LAN or a wireless LAN. For example, when performing the data communication through the wireless LAN, the communication unit 30 may perform directly the data communication with the receiving terminal 2. When performing the data communication through the wire LAN, the communication unit 30 may perform the data communication with the receiving terminal 2 through a base station for a wireless LAN. That is, the communication unit 30 is configured to transmit data to and receive data from the base station for the wireless LAN through the wire LAN. The base station for the wireless LAN is configured to transmit data to and receive data from the receiving terminal 2 through the wireless LAN.

The storage unit 32 includes, for example, an external storage such as a hard disk drive. The storage unit 32 stores not only a database for certification shown in FIG. 2 but also a database for service, which includes the ID information and service information corresponding to the ID information. The service information is detailed information about a location (an installed location) at which the lighting device 1 is disposed (for example, any area in any floor of a building) and/or information relating to the installed location (for example, information about a discount provided by a store near the installed location). However, the service information is not limited to an example described in the embodiment.

The management unit 31 is configured to manage the databases for certification and service. As described below, the management unit 31 is configured to perform certification processing of referring to the database for certification to certificate the receiving terminal 2, and providing processing of providing the service information for the certificated receiving terminal 2.

Next, an operation of the visible light communication system according to the embodiment is described referring to flowcharts shown in FIGS. 3A and 3B. FIG. 3A shows mainly processing performed by the controller 22 of the receiving terminal 2. FIG. 3B shows mainly processing (the certification processing and the providing processing) performed by the management unit 31 of the server 3.

First, when receiving the ID information from the visible light receiver 21 (step S11), the controller 22 of the receiving terminal 2 makes the GPS positioning unit 23 position the positional information (the first positional information) about the present location of the receiving terminal 2 (step S12). Then, the controller 22 generates a transmission frame for requesting to provide the service information to the server 3 and then outputs the transmission frame to the radio communication unit 24. The transmission frame includes the first positional information positioned by the GPS positioning unit 23, and the ID information acquired from the visible light receiver 21. The radio communication unit 24 transmits, to the server 3, a wireless signal generated by modulating the transmission frame received from the controller 22 (step S13). That is, the radio communication unit 24 transmits the ID information and the first positional information to the server 3.

When acquiring the ID information and the positional information (the first positional information) received by the communication unit 30 (step S21), the management unit 31 of the server 3 performs the certification processing for the ID information and the positional information. First, the management unit 31 refers to the database for certification stored in the storage unit 32. Then, the management unit 31 calculates an error (a positional error) between a position, which is shown by the second positional information corresponding to the ID information transmitted by the receiving terminal 2, and a position, which is shown by the first positional information transmitted by the receiving terminal 2 (step S22). Then, the management unit 31 determines whether or not the calculated positional error is within an acceptable range (for example, several tens to several hundred meters) (step S23). When the positional error is within the acceptable range (step S23: yes), the management unit 31 determines that the ID information of the receiving terminal 2 is justifiable. Then, The management unit 31 reads out the service information corresponding to the ID information from the database for service stored in the storage unit 32 and makes the communication unit 30 reply the service information to the receiving terminal 2 (step S24). On the other hand, when the positional error is out of the acceptable range (step S23: no), the management unit 31 determines that the ID information of the receiving terminal 2 is not justifiable and then makes the communication unit 30 reply an error (error information) to the receiving terminal 2 (step S25).

In the receiving terminal 2, when the radio communication unit 24 receives a reply from the server 3 (step S14), the controller 22 determines whether or not to have acquired the service information (step S15). When determining that the controller 22 has acquired the service information (step S15: yes), the controller 22 executes prescribed application software based on the service information (step S16), and then provides service for a user carrying the receiving terminal 2. On the other hand, when determining that the controller 22 has not acquired the service information, that is, the radio communication unit 24 receives the error information (step S15: no), the controller 22 performs prescribed error processing, for example, makes a display device included in the receiving terminal 2 perform an error display (step S17).

As described above, the visible light communication system according to the embodiment includes the at least one lighting device 1, the server 3, and the portable receiving terminal 2. The lighting device 1 is assigned with the unique ID information. The lighting device 1 is configured to transmit the ID information with the illumination light as the communication medium. The server 3 is configured to manage the service information corresponding to the ID information. The receiving terminal 2 is configured to receive the illumination light emitted from the lighting device 1 to acquire the ID information. The receiving terminal 2 is configured to transmit the acquired ID information to the server 3 to receive, from the server 3, the service information corresponding to the acquired ID information. The receiving terminal 2 includes the positional information acquisition unit (the GPS positioning unit 23) and the transmitter (the radio communication unit 24). The positional information acquisition unit is configured to acquire the first positional information showing the present location of the receiving terminal 2. The transmitter is configured to transmit, to the server 3, the ID information and the first positional information acquired by the positional information acquisition unit. The server 3 is configured to manage the second positional information, which shows the location of the lighting device 1, so that the second positional information is associated with the ID information of the lighting device 1. Then, the server 3 is configured to determine whether or not the ID information received from the receiving terminal 2 is justifiable based on the second positional information, which corresponds to the ID information received from the receiving terminal 2, and the first positional information, which is received from the receiving terminal 2. The server 3 is configured to reply, to the receiving terminal 2, the service information corresponding to the ID information received from the receiving terminal 2 when determining that the ID information received from the receiving terminal 2 is justifiable. The server 3 is configured not to reply the service information to the receiving terminal 2 when determining that the ID information received from the receiving terminal 2 is not justifiable.

Therefore, ID information transmitted from a location that is different from an installation location of the lighting device 1 (a location at which the positional error is out of the acceptable range) is determined not to be justifiable, and then, the service information is not transmitted to a transmitter that transmitted the ID information. Therefore, the visible light communication system according to the embodiment is able to more improve the security for the ID information compared with a conventional example.

As the embodiment, preferably, the positional information acquisition unit (the GPS positioning unit 23) is configured to acquire the first positional information (the information showing the present location of the receiving terminal 2) with the global positioning system 5.

However, the positional information acquisition unit is not limited to the GPS positioning unit 23 utilizing the global positioning system 5. For example, if the receiving terminal 2 has a function of a mobile phone (a mobile-phone function), preferably, the positional information acquisition unit is configured to acquire positional information (base-station information) of a base station 6 with the mobile-phone function and then regard the base-station information as the first positional information (the information showing the present location of the receiving terminal 2). That is, preferably, the receiving terminal 2 includes a radio communication unit (a first communication unit 25), which has the mobile-phone function, as the positional information acquisition unit, and the radio communication unit is configured to perform an operation described below. The radio communication unit is configured to acquire the base station information from the base station 6 with the mobile-phone function and regard the base station information as the first positional information. The mobile-phone function is a function for performing the radio communication with the base station 6 for mobile phones 7. The base station information shows the location of the base station 6.

If the receiving terminal 2 has a function (a radio-communication function) for performing radio communication with an access point 8 for a wireless LAN, preferably, the positional information acquisition unit is configured to acquire positional information (access-point information) of the access point 8 with the radio-communication function and then regard the access-point information as the first positional information (the information showing the present location of the receiving terminal 2). That is, preferably, the receiving terminal 2 includes a radio communication unit (a second communication unit 26), which has the radio-communication function, as the positional information acquisition unit, and the radio communication unit is configured to perform an operation described below. The radio communication unit is configured to acquire the access point information from the access point 8 for the wireless LAN with the radio-communication function and regard the access point information as the first positional information. The radio-communication function is a function for performing the radio communication with the access point 8. The access point information shows the location of the access point 8.

As the embodiment, preferably, the server 3 is configured to perform an operation described below. The server 3 is configured to calculate the positional error based on the second positional information, which corresponds to the ID information received from the receiving terminal 2, and the first positional information, which is received from the receiving terminal 2. The positional error is a distance between a position shown by the first positional information and a position shown by the second positional information. The server 3 determines that the ID information is justifiable when the positional error is within the predetermined acceptable range. The server 3 determines that the ID information is not justifiable when the positional error is out of the acceptable range.

As the embodiment, when acquiring the service information from the server 3, preferably, the receiving terminal 2 is configured to execute the prescribed application software based on the service information.

As the embodiment, when determining that the ID information received from the receiving terminal 2 is not justifiable, preferably, the server 3 is configured to reply the error information to the receiving terminal 2. When receiving the error information from the server 3, preferably, the receiving terminal 2 is configured to perform the prescribed error processing.

The visible light communication system may include a plurality of lighting devices.

By the way, in the receiving terminal 2 according to the embodiment, the GPS positioning unit 23 is configured to output the first positional information to the controller 22, and the controller 22 is configured to transmit the ID information and the first positional information to the server 3. For that reason, There is the fear that a third party counterfeits the first positional information with the controller 22 and then makes the server 3 perform certification with the counterfeited first positional information. Therefore, preferably, application programing interface (API) is installed in an operation system performed by the microcomputer of the controller 22. Then, the application programing interface executes processing for generating the transmission frame including the ID information and the first positional information positioned by the GPS positioning unit 23. Therefore, it is possible to prevent the counterfeit for the positional information of the GPS 5 (the first positional information) with application program executed on the operating system.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A visible light communication system, comprising:
at least one lighting device assigned with unique ID information, the lighting device being configured to transmit the ID information with illumination light as a communication medium;
a server configured to manage service information corresponding to the ID information; and
a portable receiving terminal configured to receive the illumination light emitted from the lighting device to acquire the ID information, the receiving terminal being configured to transmit the acquired ID information to the server to receive, from the server, the service information corresponding to the acquired ID information,
wherein the receiving terminal comprises:
a positional information acquisition unit configured to acquire first positional information showing a present location of the receiving terminal; and
a transmitter configured to transmit, to the server, the ID information and the first positional information acquired by the positional information acquisition unit,
wherein the server is configured to manage second positional information, which shows a location of the lighting device, so that the second positional information corresponds to the ID information of the lighting device, and
wherein the server is configured to calculate a positional error based on the second positional information, which shows a location of the lighting device and corresponds to the ID information received from the receiving terminal, and the first positional information, which shows the present location of the receiving terminal and is received from the receiving terminal, the position error being a distance between a position shown by the first positional information and a position shown by the second positional information,
the server being configured to reply, to the receiving terminal, the service information corresponding to the ID information received from the receiving terminal when the position error is within a predetermined acceptable range,
the server being configured not to reply the service information to the receiving terminal when the position error is out of the acceptable range.

2. The visible light communication system according to claim 1,
wherein the positional information acquisition unit is configured to acquire the first positional information with a global positioning system.

3. The visible light communication system according to claim 2, wherein when acquiring the service information from the server, the receiving terminal is configured to execute prescribed application software based on the service information.

4. The visible light communication system according to claim 2,
wherein when the positional error is out of the acceptable range, the server is configured to reply error information to the receiving terminal, and
wherein when receiving the error information from the server, the receiving terminal is configured to perform a prescribed error processing.

5. The visible light communication system according to claim 2, wherein the at least one lighting device comprises a plurality of lighting devices.

6. The visible light communication system according to claim 1,
wherein the receiving terminal comprises a radio communication unit as the positional information acquisition unit, the radio communication unit having a mobilephone function for performing radio communication with a base station for mobile phones, and
wherein the radio communication unit is configured to acquire base station information, which shows a location of the base station, from the base station with the mobilephone function and regard the base station information as the first positional information.

7. The visible light communication system according to claim 6, wherein when acquiring the service information from the server, the receiving terminal is configured to execute prescribed application software based on the service information.

8. The visible light communication system according to claim 6,
wherein when the positional error is out of the acceptable range, the server is configured to reply error information to the receiving terminal, and
wherein when receiving the error information from the server, the receiving terminal is configured to perform a prescribed error processing.

9. The visible light communication system according to claim 6, wherein the at least one lighting device comprises a plurality of lighting devices.

10. The visible light communication system according to claim 1,
- wherein the receiving terminal comprises a radio communication unit as the positional information acquisition unit, the radio communication unit having a radio-communication function for performing radio communication with an access point for wireless LAN, and
- wherein the radio communication unit is configured to acquire access point information, which shows a location of the access point, from the access point with the radio-communication function and regard the access point information as the first positional information.

11. The visible light communication system according to claim 10, wherein when acquiring the service information from the server, the receiving terminal is configured to execute prescribed application software based on the service information.

12. The visible light communication system according to claim 10,
- wherein when the positional error is out of the acceptable range, the server is configured to reply error information to the receiving terminal, and
- wherein when receiving the error information from the server, the receiving terminal is configured to perform a prescribed error processing.

13. The visible light communication system according to claim 10, wherein the at least one lighting device comprises a plurality of lighting devices.

14. The visible light communication system according to claim 1,
- wherein when acquiring the service information from the server, the receiving terminal is configured to execute prescribed application software based on the service information.

15. The visible light communication system according to claim 1,
- wherein when the positional error is out of the acceptable range, the server is configured to reply error information to the receiving terminal, and
- wherein when receiving the error information from the server, the receiving terminal is configured to perform a prescribed error processing.

16. The visible light communication system according to claim 1, wherein the at least one lighting device comprises a plurality of lighting devices.

17. A server configured to manage service information corresponding to ID information that a portable receiving terminal has acquired from a lighting device with illumination light, as a communication medium, emitted from at least one lighting device assigned with unique ID information,
- the server being configured to receive, from the receiving terminal, the ID information that the receiving terminal acquires from the lighting device and first positional information showing a present location of the receiving terminal,
- the server being configured to manage second positional information, which shows a location of the lighting device, so that the second positional information corresponds to the ID information of the lighting device,
- the server being configured to calculate a positional error based on the second positional information, which shows a location of the lighting device and corresponds to the ID information received from the receiving terminal, and the first positional information, which shows the present location of the receiving terminal and is received from the receiving terminal, the positional error being a distance between a position shown by the first positional information and a position shown by the second positional information,
- the server being configured to reply, to the receiving terminal, the service information corresponding to the ID information received from the receiving terminal when the positional error is within a predetermined acceptable range,
- the server being configured not to reply the service information to the receiving terminal when the positional error is out of the acceptable range.

* * * * *